US011164578B2

(12) United States Patent
Nakada

(10) Patent No.: US 11,164,578 B2
(45) Date of Patent: Nov. 2, 2021

(54) VOICE RECOGNITION APPARATUS, VOICE RECOGNITION METHOD, AND NON-TRANSITORY COMPUTER-READABLE STORAGE MEDIUM STORING PROGRAM

(71) Applicant: HONDA MOTOR CO., LTD., Tokyo (JP)

(72) Inventor: Keigo Nakada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 225 days.

(21) Appl. No.: 16/418,167

(22) Filed: May 21, 2019

(65) Prior Publication Data

US 2019/0371325 A1 Dec. 5, 2019

(30) Foreign Application Priority Data

Jun. 4, 2018 (JP) .............................. JP2018-107129

(51) Int. Cl.
*G10L 15/00* (2013.01)
*G10L 15/22* (2006.01)
(Continued)

(52) U.S. Cl.
CPC .............. *G10L 15/22* (2013.01); *B60K 35/00* (2013.01); *G10L 15/08* (2013.01);
(Continued)

(58) Field of Classification Search
CPC ......... G10L 15/00; G10L 15/20; G10L 15/22; G10L 15/26; G10L 15/30; G10L 15/083;
(Continued)

(56) References Cited

U.S. PATENT DOCUMENTS 8,738,378 B2 * 5/2014 Harada .................... G10L 15/10
704/254
2004/0117179 A1 * 6/2004 Balasuriya .............. G10L 15/32
704/231

(Continued)

FOREIGN PATENT DOCUMENTS

JP 2009288630 * 12/2009 ............. G10L 15/28
JP 2017-167391 A 9/2017
(Continued)

OTHER PUBLICATIONS

Këpuska, V. Z., & Klein, T. B. (2009). A novel wake-up-word speech recognition system, wake-up-word recognition task, technology and evaluation. Nonlinear Analysis: Theory, Methods & Applications, 71(12), e2772-e2789. (Year: 2009).*

*Primary Examiner* — Edgar X Guerra-Erazo
(74) *Attorney, Agent, or Firm* — Thomas | Horstemeyer, LLP

(57) ABSTRACT

A voice recognition apparatus capable of executing a function by a voice instruction, comprises an input unit configured to input a voice, and a control unit configured to enable the voice recognition apparatus to accept a voice instruction for executing a function, if a voice input by the input unit is an activation phrase. The voice recognition apparatus comprises a recognition unit configured to, if a voice input by the input unit after the control unit has enabled the voice recognition apparatus to accept the voice instruction contains the activation phrase, recognize the voice instruction by excluding the activation phrase from the voice.

15 Claims, 7 Drawing Sheets

(51) Int. Cl.
*B60K 35/00* (2006.01)
*G10L 15/08* (2006.01)

(52) U.S. Cl.
CPC .. *B60K 2370/148* (2019.05); *G10L 2015/088* (2013.01); *G10L 2015/223* (2013.01)

(58) Field of Classification Search
CPC ......... G10L 2015/223; G10L 2015/228; G10L 17/00; G10L 17/22
See application file for complete search history.

(56) References Cited

U.S. PATENT DOCUMENTS

| | | | | |
|---|---|---|---|---|
| 2004/0192384 | A1* | 9/2004 | Anastasakos | G10L 15/30 455/557 |
| 2005/0179540 | A1* | 8/2005 | Rubenstein | G10L 15/22 340/539.18 |
| 2006/0190097 | A1* | 8/2006 | Rubenstein | G10L 15/22 700/17 |
| 2010/0088098 | A1* | 4/2010 | Harada | G10L 15/10 704/254 |
| 2014/0113581 | A1* | 4/2014 | Nassimi | H04M 3/42153 455/404.1 |

FOREIGN PATENT DOCUMENTS

| | | |
|---|---|---|
| JP | 2017-204252 A | 11/2017 |
| JP | 2018-042254 A | 3/2018 |

\* cited by examiner

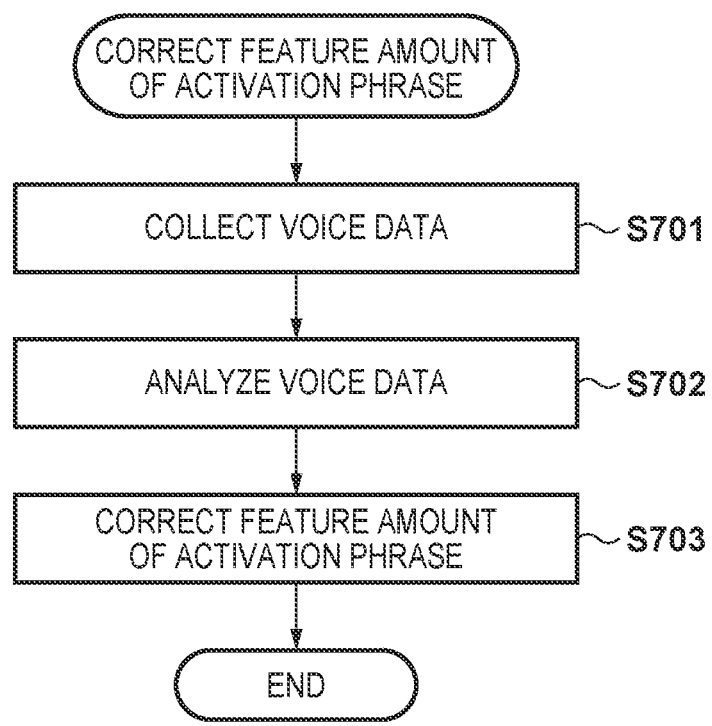

VOICE RECOGNITION APPARATUS, VOICE RECOGNITION METHOD, AND NON-TRANSITORY COMPUTER-READABLE STORAGE MEDIUM STORING PROGRAM

CROSS-REFERENCE TO RELATED APPLICATION(S)

This application claims priority to and the benefit of Japanese Patent Application No. 2018-107129 filed on Jun. 4, 2018, the entire disclosure of which is incorporated herein by reference.

BACKGROUND OF THE INVENTION

Field of the Invention

The present invention relates to a voice recognition apparatus for recognize a voice, a voice recognition method, and a non-transitory computer-readable storage medium storing a program.

Description of the Related Art

Recently, the functions of voice interaction between a system and a user, for example, voice interaction between a vehicle system and a driver are enhanced, and the convenience is more and more improving. Japanese Patent Laid-Open No. 2017-204252 describes a navigation apparatus that activates voice recognition when the traveling distance, traveling time, and traveling area of a vehicle satisfy predetermined conditions, thereby generating an access message to the user. Japanese Patent Laid-Open No. 2017-204252 also describes that the user can obtain useful information when the contents of the access message are a dialect and sightseeing information unique to the prefecture.

It is also known that in voice interaction between a system and a user, the user can execute a desired application by giving instructions by a voice by using a microphone. Japanese Patent Laid-Open No. 2018-42254 describes that a user inputs the name, keyword, and the like of an application to be activated to a microphone 214 by a voice. Japanese Patent Laid-Open No. 2018-42254 describes that the user continuously inputs a keyword for activating an application and a keyword for designating the operation of the application, like "Navigation, Tokyo Station". Japanese Patent Laid-Open No. 2017-167391 describes that when a worker utters "Open" and a work selection processing control unit 109 determines that the utterance is a start designation keyword "Open", a guidance voice output unit 103 outputs a voice, for example, "Select a work to be started".

When a user inputs an activation phrase as a trigger by a voice in order to execute a desired function, the user sometimes feels anxious about whether the voice input has been performed without any problem, even though one-time voice input is satisfactory to the system. In this case, the user may repeat the voice input of the activation phrase although the system has already recognized the activation phrase. Consequently, since the activation phrase is input by a voice even though the system is expecting a voice instruction for executing a function, the system may incorrectly recognize a voice instruction.

SUMMARY OF THE INVENTION

The present invention provides a voice recognition apparatus for preventing a voice instruction recognition error, a voice recognition method, and a non-transitory computer-readable storage medium storing a program.

The present invention in its first aspect provides a voice recognition apparatus capable of executing a function by a voice instruction, comprising: an input unit configured to input a voice; a control unit configured to enable the voice recognition apparatus to accept a voice instruction for executing a function, if a voice input by the input unit is an activation phrase; and a recognition unit configured to, if a voice input by the input unit after the control unit has enabled the voice recognition apparatus to accept the voice instruction contains the activation phrase, recognize the voice instruction by excluding the activation phrase from the voice.

The present invention in its second aspect provides a voice recognition method to be executed in a voice recognition apparatus capable of executing a function by a voice instruction, comprising: inputting a voice; enabling the voice recognition apparatus to accept a voice instruction for executing a function, if the input voice is an activation phrase; and if a voice input after the voice recognition apparatus is enabled to accept the voice instruction contains the activation phrase, recognizing the voice instruction by excluding the activation phrase from the voice.

The present invention in its third aspect provides a non-transitory computer-readable storage medium storing a program that operates a computer to perform: inputting a voice; enabling a voice recognition apparatus to accept a voice instruction for executing a function, if the input voice is an activation phrase; and if a voice input after the voice recognition apparatus is enabled to accept the voice instruction contains the activation phrase, recognizing the voice instruction by excluding the activation phrase from the voice.

The present invention can prevent a voice instruction recognition error.

BRIEF DESCRIPTION OF THE DRAWINGS

FIG. 9 is a flowchart showing an activation phrase feature amount changing process.

DESCRIPTION OF THE EMBODIMENTS

Figure 1:
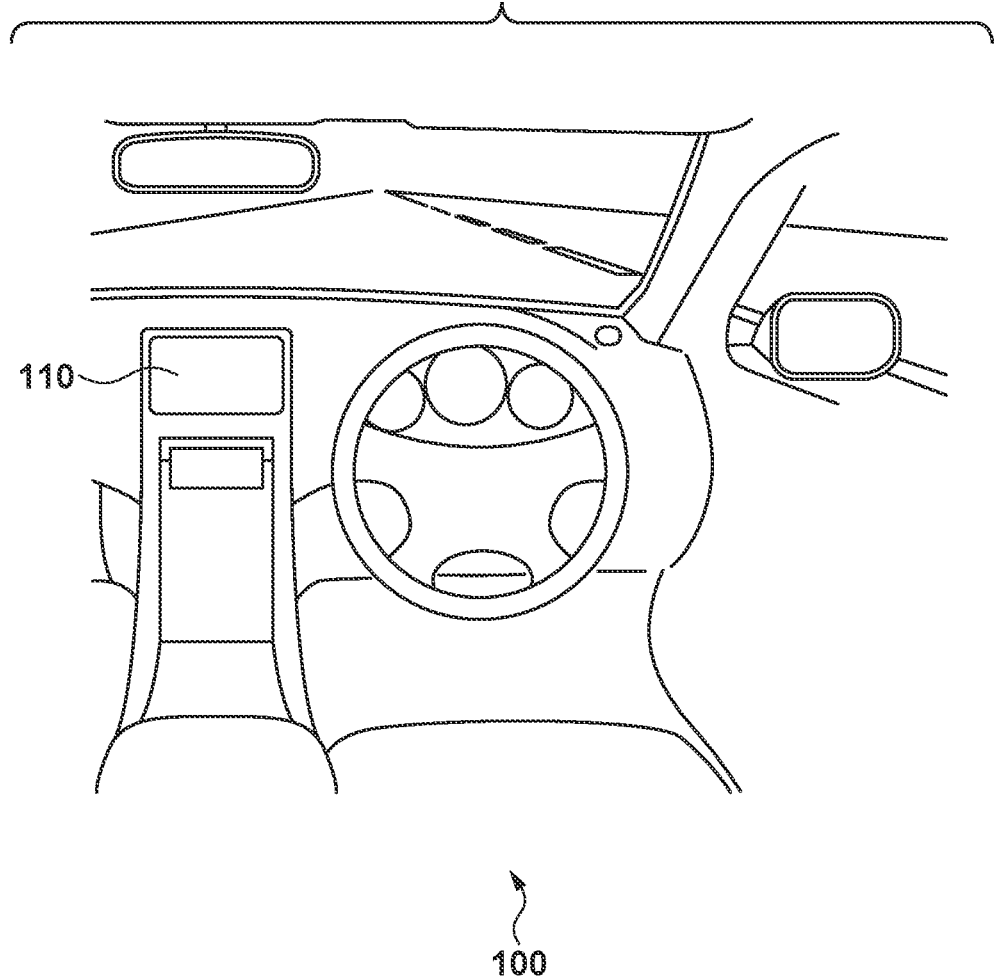
FIG. 1 is a view showing the way a display apparatus is mounted in a vehicle.

Embodiments of the present invention will be explained in detail below with reference to the accompanying drawings. Note that the following embodiments do not restrict the invention according to the scope of claims, and not all combinations of features explained in the embodiments are necessarily essential to the invention. Two or more features of a plurality of features explained in the embodiments can freely be combined. Note also that the same reference numerals denote the same or similar parts, and a repetitive explanation thereof will be omitted.

FIG. 1 is a view showing the way a display apparatus of this embodiment is mounted in a vehicle. As shown in FIG. 1, a display apparatus 110 is installed in an almost central portion of an instrument panel in the cabin of a vehicle 100. However, the installation position of the display apparatus 110 is not limited to the portion shown in FIG. 1. For example, the display apparatus 110 may also be installed in a position facing a front passenger's seat or in a position facing a rear seat.

Figure 2:
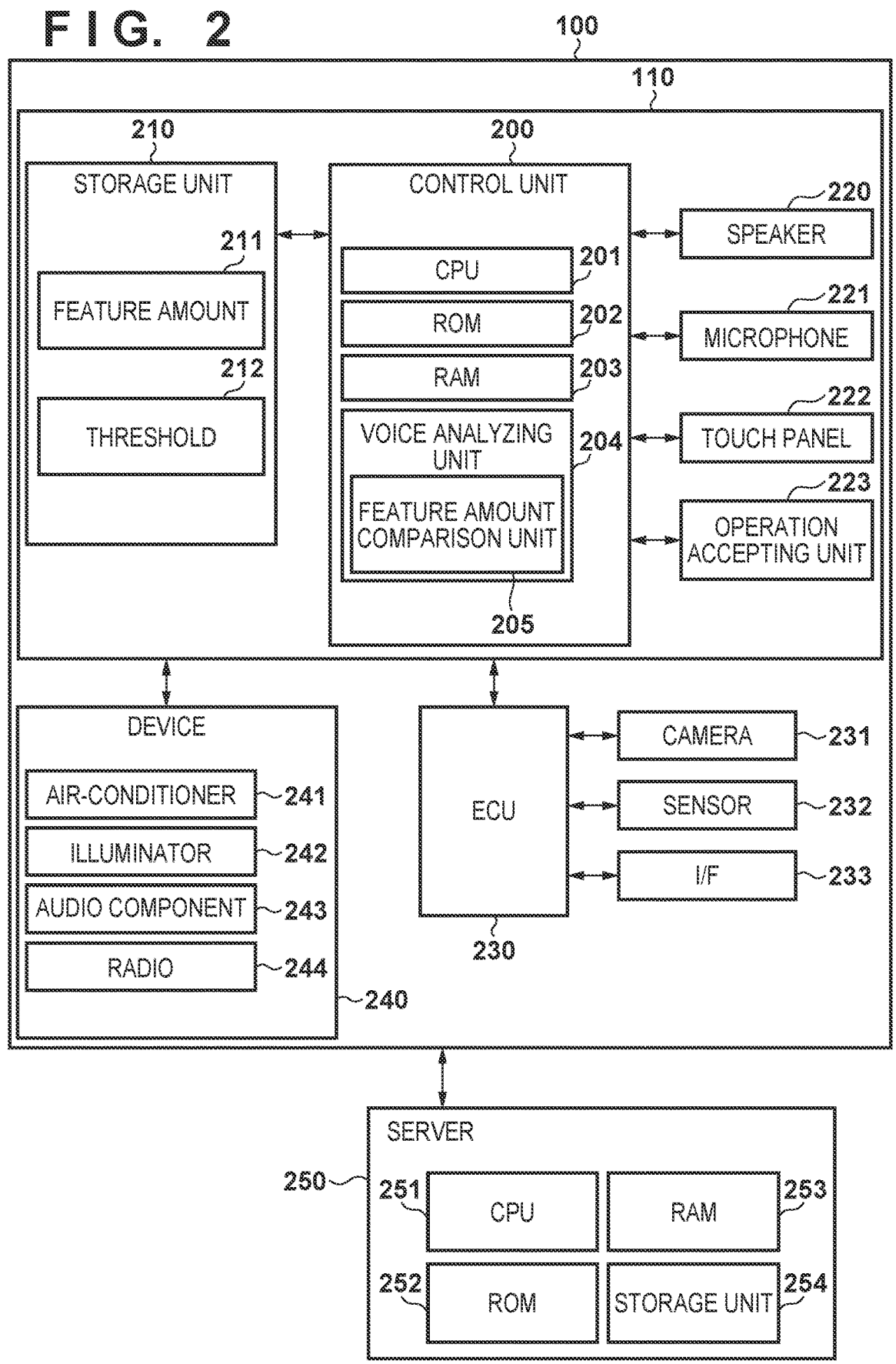
FIG. 2 is a view showing the internal configuration of the display apparatus.

FIG. 2 is a view showing the internal configuration of the display apparatus 110. As shown in FIG. 2, the display apparatus 110 includes a control unit 200, a storage unit 210, a speaker 220, a microphone 221, a touch panel 222, and an operation accepting unit 223. The control unit 200 comprehensively controls the whole display apparatus 110, and can also communicate with an ECU (Electronic Control Unit) 230.

In the control unit 200, individual blocks are connected via a bus, and a CPU 201 controls each block connected to the bus. A ROM 202 stores a basic control program and parameters for operating the control unit 200. The operation of the display apparatus 110 as explained in this embodiment is implemented by the CPU 201 by loading the control program and parameters into a RAM 203 and executing them. The display apparatus 110 can also be a computer for carrying out the present invention according to the program.

A voice analyzing unit 204 analyzes voice data of a voice input from the microphone 221. For example, the voice analyzing unit 204 analyzes the frequency component, the amplitude, the interval, and the rhythm based on the voice data. A feature amount comparison unit 205 compares a feature amount 211 stored in the storage unit 210 with the voice data as an analysis target of the voice analyzing unit 204, and determines whether the voice data contains a portion similar to the feature amount 211.

The storage unit 210 is a hard disk or the like, and stores the feature amount 211 and a threshold 212. The feature amount 211 is the feature amount of an activation phrase (to be described later). The feature amount 211 can be the result of analysis performed by the voice analyzing unit 204 on a predetermined activation phrase input by the microphone 221, and can also be obtained from an external server 250. The threshold 212 is used in the comparison by the feature amount comparison unit 205. The feature amount comparison unit 205 specifies a portion whose similarity to the feature amount 211 is equal to or larger than the threshold 212, from the voice data as an analysis target of the voice analyzing unit 204.

The speaker 220 outputs, for example, a guidance for a setting screen or a navigation screen to be displayed on the touch panel 222, by a voice. The microphone 221 receives the voice of a user. In this embodiment, a user is a passenger in the cabin of the vehicle 100. The input voice data can also be used in, for example, the authentication of a passenger. The touch panel 222 is a touch panel for specifying the position of a finger touching the touch panel. The operation accepting unit 223 can accept an operation from the user by, for example, a power switch, an LED, and hardware keys.

The ECU 230 is a unit to be mounted in a control device for implementing driving control of the vehicle 100. This driving control includes control in which the vehicle system is a main driving party, and control in which the driver is a main driving party. The ECU 230 identifies a user by obtaining image data of a passenger captured by a camera 231 installed in the cabin of the vehicle 100. In user identification, the ECU 230 can use not only the camera 231 but also voice data input from the microphone 221 or detection information from a sensor 232 such as a pressure sensor installed on a seat.

The ECU 230 can communicate with the external server 250 across a wireless communication network (not shown) by using an I/F 233. The server 250 includes a CPU 251, a ROM 252, a RAM 253, and a storage unit 254. The CPU 251 comprehensively controls the server 250 by loading a program stored in the ROM 252 into the RAM 253, and executing the program. The storage unit 254 stores information for identifying a passenger of the vehicle 100. The CPU 251 can identify the passenger based on, for example, voice data, image data, and sensor's detection information transmitted from the vehicle 100. The ECU 230 can also connect to the Internet via the I/F 233.

The display apparatus 110 is connected to devices 240 so that they can communicate with each other. The devices 240 include an air-conditioner 241, an illuminator 242, an audio component 243, and a radio 244 installed in the cabin of the vehicle 100. The display apparatus 110 transmits setting information set on the setting screen displayed on the touch panel 222, for example, volume information of the audio component 243, to each device of the devices 240. Based on the transmitted setting information, each device controls its operation.

Also, in this embodiment, the display apparatus 110 can control the operations of the devices 240 in accordance with user's voice instructions input from the microphone 221. For example, when the user inputs a voice instruction "Play back CD", the CPU 201 controls the audio component 243 to play back the CD based on an interpretation result from the voice analyzing unit 204. The display apparatus 110 can also cooperate with the ECU 230 in accordance with user's voice instructions input from the microphone 221. For example, when the user inputs a voice instruction "Search for nearby restaurants", the CPU 201 requests the ECU 230 to perform the search based on an interpretation result from the voice analyzing unit 204. Then, the ECU 230 obtains current position information of the vehicle 100 from a GPS sensor (not shown), obtains nearby restaurant information on the Internet via the I/F 233, and transmits the information to the CPU 201. The CPU 201 displays the restaurant information on the touch panel 222. The ECU 230 may also request the server 250 to perform the search.

Figure 3:
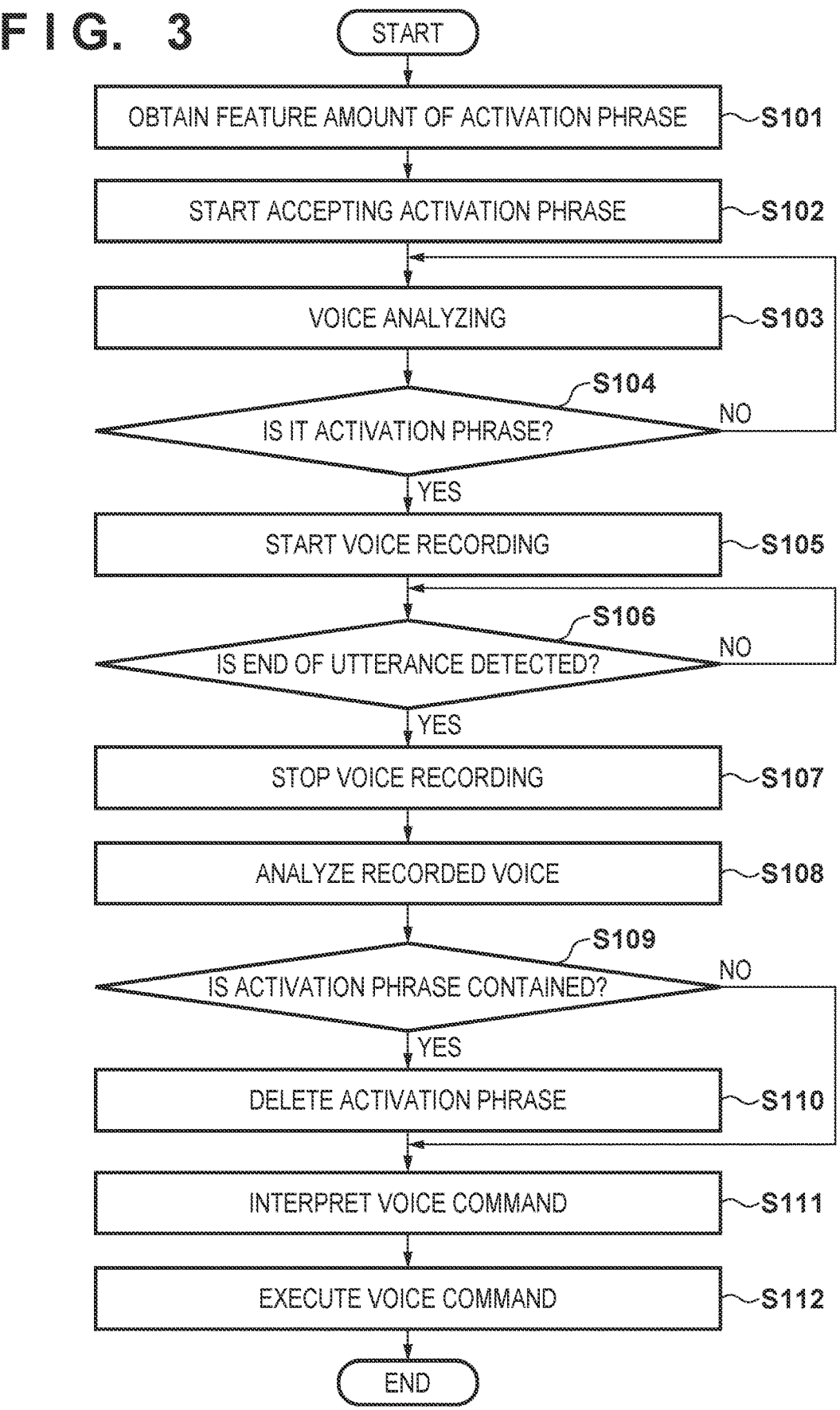
FIG. 3 is a flowchart showing a voice command execution process.

FIG. 3 is a flowchart showing a voice command execution process according to this embodiment. This process shown in FIG. 3 is implemented by, for example, the CPU 201 by loading a program stored in the ROM 202 into the RAM 203 and executing the program. The process shown in FIG. 3 is started when, for example, the power supply of the display apparatus 110 is turned on.

In step S101, the CPU 201 obtains the feature amount 211 of an activation phrase stored in the storage unit 210. The activation phrase herein mentioned is voice data such as "Hello, wake up", and the frequency component, amplitude, interval, rhythm, and the like of the voice data are predetermined as the feature amount 211. In step S102, the CPU 201 starts accepting the activation phrase. When the acceptance of the activation phrase is started, the process advances to step S103, and the CPU 201 causes the voice analyzing unit 204 to start analyzing the voice data.

While the voice data is being analyzed, the feature amount comparison unit 205 compares the voice data with the feature amount 211. In step S104, the feature amount comparison unit 205 determines whether the activation phrase is input by a voice.

Figure 4:
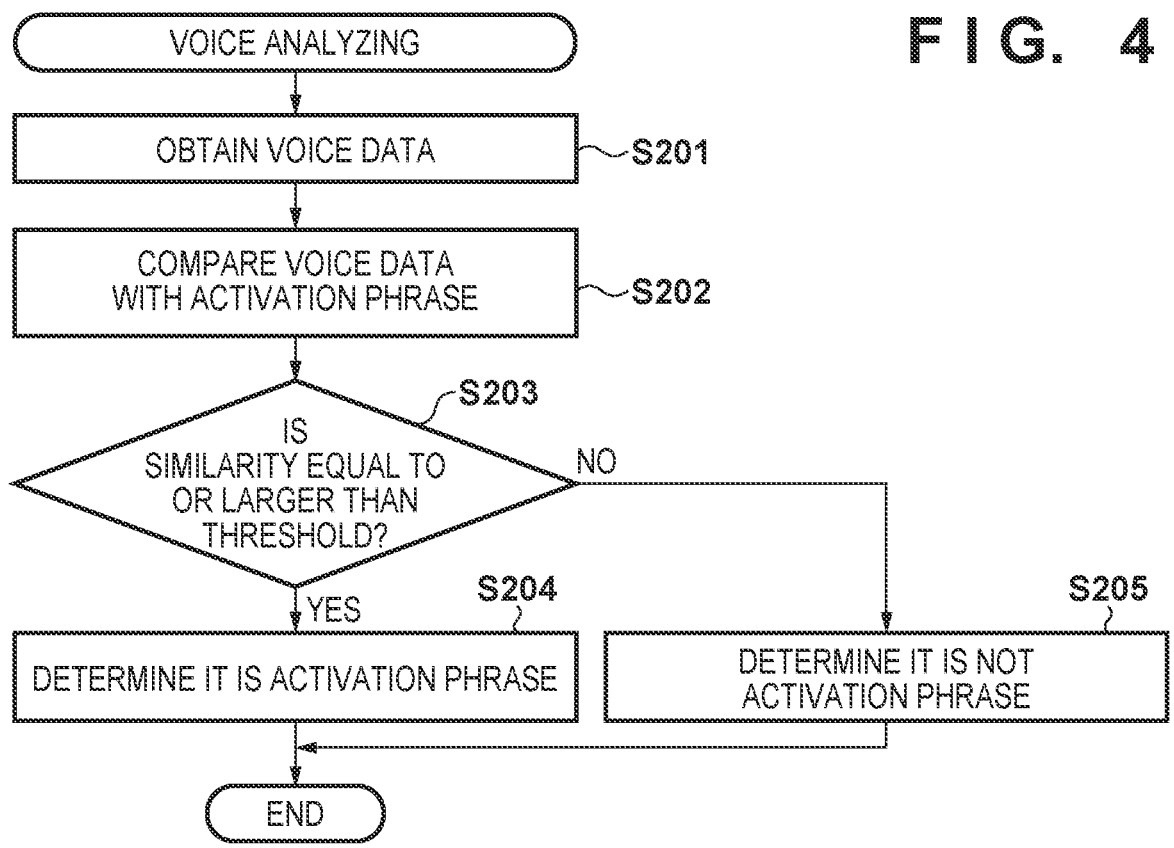
FIG. 4 is a flowchart showing an activation phrase determination process.

FIG. 4 is a flowchart showing the processing in step S104. In step S201, the voice analyzing unit 204 obtains voice data as an analysis target. In step S202, the feature amount comparison unit 205 compares, for a similarity, a feature amount of the voice data with the feature amount 211 of the activation phrase. In step S203, the feature amount comparison unit 205 determines whether the similarity is equal to or larger than the threshold 212. Assume that the threshold 212 is a threshold A. If it is determined in step S203 that the similarity is equal to or larger than the threshold A, the process advances to step S204, and the voice analyzing unit 204 determines that the voice data is the activation phrase, and terminates the process shown in FIG. 4. On the other hand, if it is determined in step S203 that the similarity is smaller than the threshold A, the process advances to step S205, and the voice analyzing unit 204 determines that the voice data is not the activation phrase, and terminates the process shown in FIG. 4.

If it is determined in step S204 that the voice data is the activation phrase, it is determined in step S104 that the activation phrase is input by a voice, and the process advances to step S105. On the other hand, if it is determined in step S205 that the voice data is not the activation phrase, it is determined in step S104 that the activation phrase is not input by a voice, and the processing in step S104 is repeated.

In step S105, the voice analyzing unit 204 starts recording the voice data in order to interpret a voice command in the subsequent step. In step S106, the voice analyzing unit 204 determines whether the end of the utterance of the user is detected. For example, if there is a predetermined blank period, the voice analyzing unit 204 can determine that the end of the utterance of the user is detected. If it is determined that the end of the utterance of the user is not detected, the processing in step S106 is repeated. On the other hand, if it is determined that the end of the utterance of the user is detected, the process advances to step S107. In step S107, the voice analyzing unit 204 stops recording the voice data.

In step S108, the voice analyzing unit 204 analyzes the recorded voice data. In step S109, the feature amount comparison unit 205 determines whether the activation phrase is input by a voice.

In this embodiment, even after the activation phrase is input by a voice, whether the activation phrase is input by a voice is further determined. This is so because even if the apparatus is activated by the activation phrase when the user inputs a voice instruction "Hello, wake up", the user sometimes does not notice the activation or wonders whether the apparatus is actually activated. In this case, the user may input a voice instruction "Hello, wake up. Search for nearby restaurants" again by repeating the activation phrase. On the other hand, since the apparatus is activated by the first "Hello, wake up", the apparatus recognizes the rest as a voice command. However, the voice input is "Hello, wake up. Search for nearby restaurants", so the existence of the activation phrase may make the voice command ambiguous.

In this embodiment, therefore, after the apparatus is activated by the activation phrase, it is further determined whether voice data contains the activation phrase, and, if the activation phrase is contained, the activation phrase is excluded. It is also possible to ignore the activation phrase part in step S111 without excluding the activation phrase part from the voice data. This configuration makes it possible to correctly recognize a voice command.

If it is determined in step S109 that the activation phrase is input by a voice, the process advances to step S110, and the voice analyzing unit 204 deletes the activation phrase from the voice data, and advances to step S111. On the other hand, if it is determined in step S109 that the activation phrase is not input by a voice, the process advances to step S111.

In step S111, the voice analyzing unit 204 interprets the voice command, and transmits the interpretation result to the CPU 201. In step S112, the CPU 201 generates setting information and controls each unit based on the interpretation result transmitted from the voice analyzing unit 204, and terminates the process shown in FIG. 3. For example, if the interpretation result is "Play back CD", the CPU 201 generates a control command indicating the playback of the CD, and controls the audio component 243. Note that when ignoring the activation phrase part instead of excluding the activation phrase part as described above, the activation phrase part is ignored when interpreting the voice command.

The process of analyzing and determining the recorded voice in steps S108 and S109 will be explained below.

Figure 5:
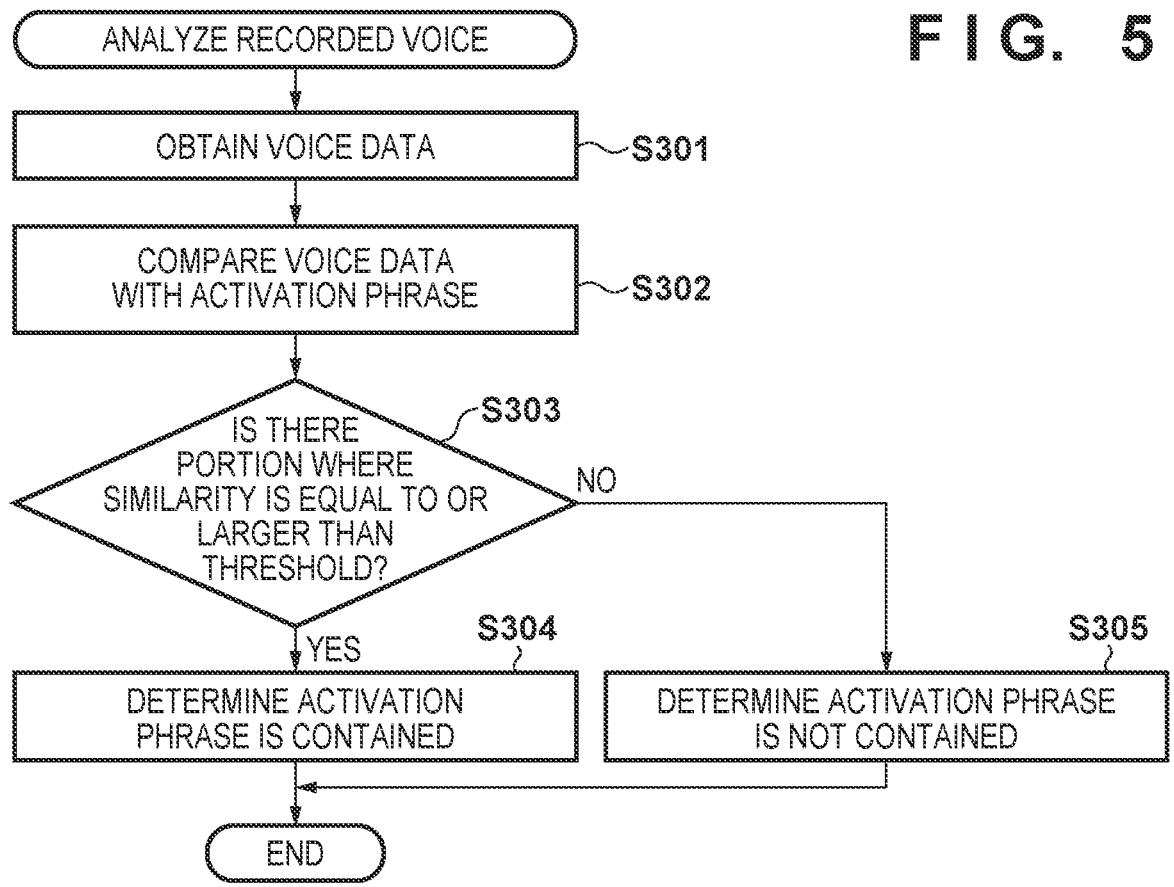
FIG. 5 is a flowchart showing a process of analyzing and determining a recorded voice.

FIG. 5 is a flowchart showing the process of analyzing and determining the recorded voice. In step S301, the voice analyzing unit 204 obtains voice data as an analysis target. In step S302, the feature amount comparison unit 205 compares, for a similarity, the feature amount of the voice data with the feature amount 211 of the activation phrase. In step S303, the feature amount comparison unit 205 determines whether there is a portion where the similarity is equal to or larger than the threshold A. If it is determined in step S303 that there is a portion where the similarity is equal to or larger than the threshold A, the process advances to step S304, and the voice analyzing unit 204 determines that the activation phrase is contained, and terminates the process shown in FIG. 5. On the other hand, if it is determined in step S303 that there is no portion where the similarity is equal to or larger than the threshold A, the process advances to step S305, and the voice analyzing unit 204 determines that the activation phrase is not contained, and terminates the process shown in FIG. 5.

If it is determined in step S304 that the activation phrase is contained, it is determined in step S109 that the activation phrase is contained, and the process advances to step S110. On the other hand, if it is determined in step S304 that the activation phrase is not contained, it is determined in step S109 that the activation phrase is not contained, and the process advances to step S111.

In the process shown in FIG. 5 as described above, the feature amount comparison unit 205 uses the same threshold A as the threshold used in the activation phrase determination process shown in FIG. 4, as the threshold of the similarity. The portion found to be the activation phrase because the similarity is equal to or larger than the threshold A is deleted in step S110. In this configuration, even when the user inputs a voice instruction by repeating the activation phrase, a voice command can correctly be recognized.

Figure 6:
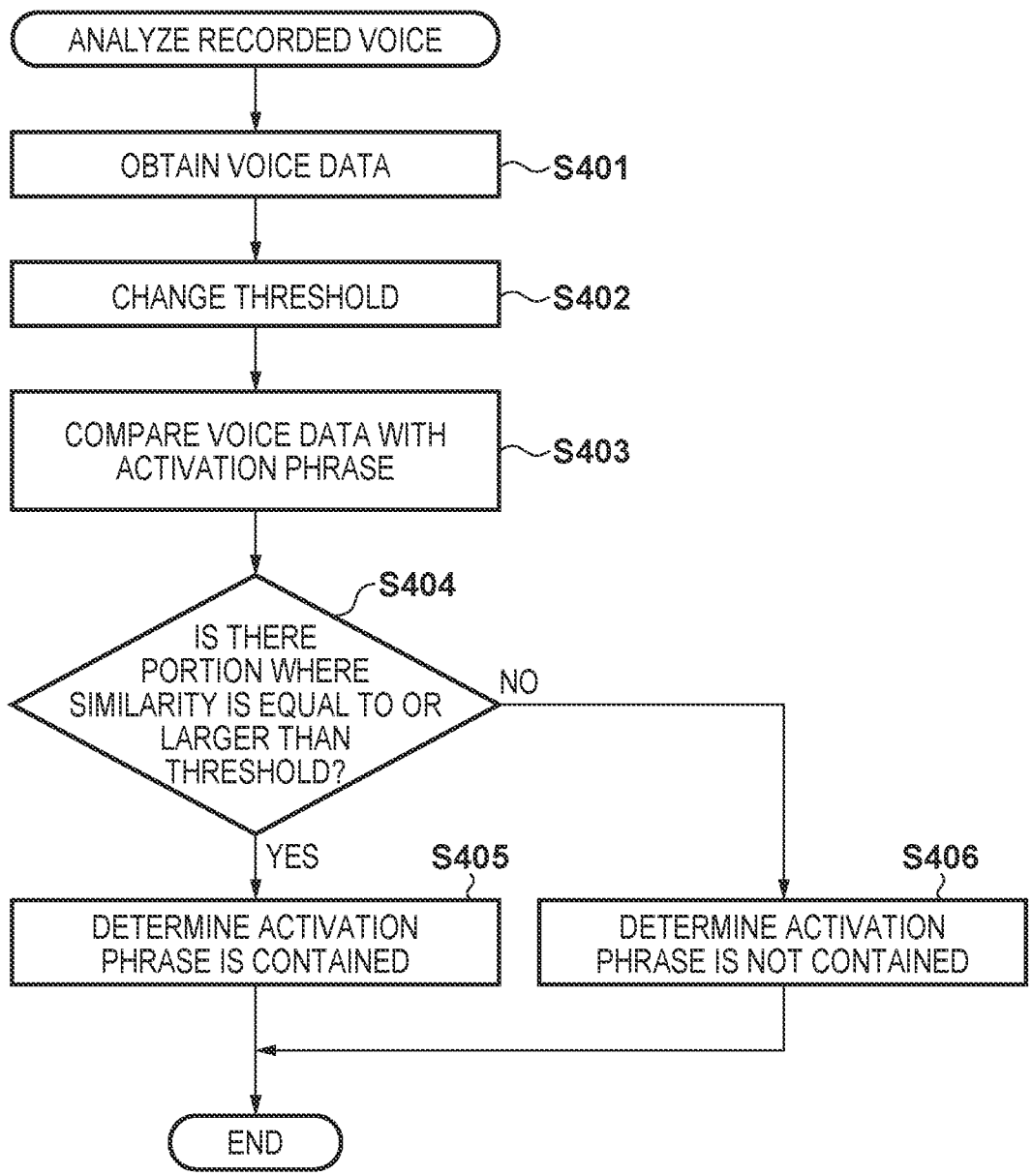
FIG. 6 is a flowchart showing the process of analyzing and determining a recorded voice.

FIG. 6 is a flowchart showing the process of analyzing and determining the recorded voice, which is different from the process shown in FIG. 5. In step S401, the voice analyzing unit 204 obtains voice data as an analysis target. In step S402, the feature amount comparison unit 205 changes the threshold. The process shown in FIG. 5 uses the same threshold A as the threshold used in the activation phrase determination process in FIG. 4, but this process changes the threshold A. This change increases or decreases the threshold A.

Increasing the threshold A is to make the similarity determination accuracy stricter. This is a case in which the activation phrase is short, like "Hi". That is, even when the user does not input a voice instruction without repeating the activation phrase, a voice command often naturally contains the word of the activation phrase, like "Haiti, where?", if the activation phrase is short. If the activation phrase is deleted in step S110 in a case like this, the voice command becomes ambiguous instead, like "Ti, where?" Therefore, after the activation phrase has made a voice command acceptable in FIG. 4, the threshold A is increased in accordance with the feature amount of the activation phrase, for example, when the number of syllables is equal to or smaller than a predetermined number. As a consequence, it is possible to prevent unnecessary deletion of the activation phrase. In the above-described example, "Hi" of the activation phrase and the "Hai" part of "Haiti" are different, in the strict sense, in the strength and change of intonation and the connection of syllables. By increasing the threshold A, it is possible to perform determination with strict accuracy, and prevent unnecessary deletion.

On the other hand, decreasing the threshold A is to make the similarity determination accuracy looser. As a general tendency, when the user wonders whether the apparatus is actually activated and inputs a voice instruction again, he or she tends to utter the activation phrase more slowly or by toning down the voice. This tendency perhaps increases as the activation phrase becomes longer. That is, the feature amount may become different from that of the initially input activation phrase. If this is the case, it may be determined in step S109 that the activation phrase is not contained, if the threshold A remains the same. Consequently, it becomes impossible to correctly interpret the voice command in step S111. After the apparatus is activated by the activation phrase in FIG. 4, therefore, the threshold A is decreased in accordance with the feature amount of the activation phrase, for example, when the number of syllables is larger than a predetermined number. This makes it possible to appropriately delete the activation phrase. For example, when a country name "Liechtenstein" is used as the activation phrase, even if the user says the activation phrase slowly again, it is determined that the voice input is the activation phrase, by decreasing the similarity of the feature amount of the rhythm.

Figure 7:
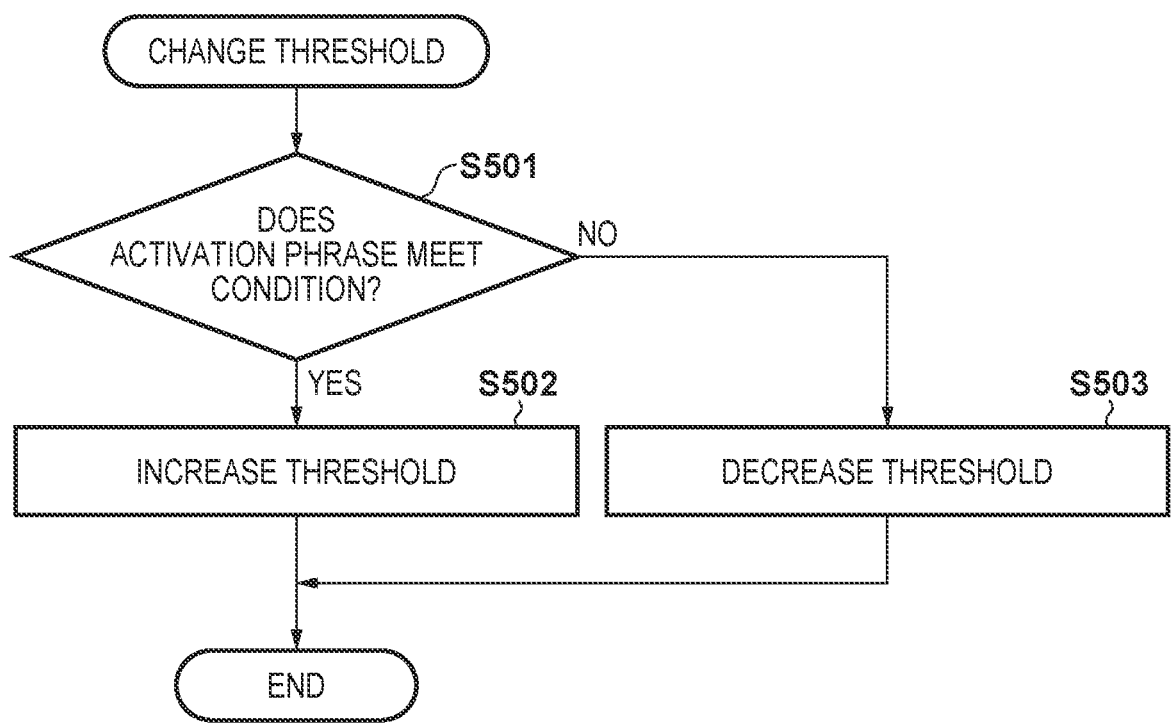
FIG. 7 is a flowchart showing a threshold changing process.

FIG. 7 is a flowchart showing the threshold changing process in step S402. In step S501, the voice analyzing unit 204 determines whether the feature amount of the activation phrase meets the condition. The feature amount of the activation phrase is, for example, a predetermined number of syllables. If the number of syllables is equal to or smaller than the predetermined number, the voice analyzing unit 204 determines that the condition is met, and increases the threshold A in step S502. On the other hand, if the number of syllables is larger than the predetermined number, the voice analyzing unit 204 determines that the condition is not met, and decreases the threshold A in step S503. After steps S502 and S503, the voice analyzing unit 204 terminates the process shown in FIG. 7.

Referring to FIG. 6 again, in step S403, the feature amount comparison unit 205 compares, for a similarity, the feature amount of the voice data with the feature amount 211 of the activation phrase. In step S404, the feature amount comparison unit 205 determines whether there is a portion where the similarity is equal to or larger than the threshold. If it is determined in step S404 that there is a portion where the similarity is equal to or larger than the threshold, the process advances to step S405, and the voice analyzing unit 204 determines that the activation phrase is contained, and terminates the process shown in FIG. 6. On the other hand, if it is determined in step S404 that there is no portion where the similarity is equal to or larger than the threshold, the process advances to step S406, and the voice analyzing unit 204 determines that the activation phrase is not contained, and terminates the process shown in FIG. 6.

If it is determined in step S405 that the activation phrase is contained, it is determined in step S109 that the activation phrase is contained, and the process advances to step S110. On the other hand, if it is determined in step S406 that the activation phrase is not contained, it is determined in step S109 that the activation phrase is not contained, and the process advances to step S111.

In step S111 of FIG. 3 in the above explanation, the voice command is interpreted, and the interpretation result is transmitted to the CPU 201. In step S111, however, it is also possible to determine whether the interpretation result is a meaningful command, before transmitting the interpretation result to the CPU 201. If the interpretation result is a meaningless command, it is also possible to output, from the speaker 220, a voice message such as "Input again" that urges the user to input the voice command again.

Next, the activation phrase changing process will be explained. In the above description, the activation phrase is preset in the display apparatus 110. A process of setting the activation phrase by the user will be explained below.

Figure 8:
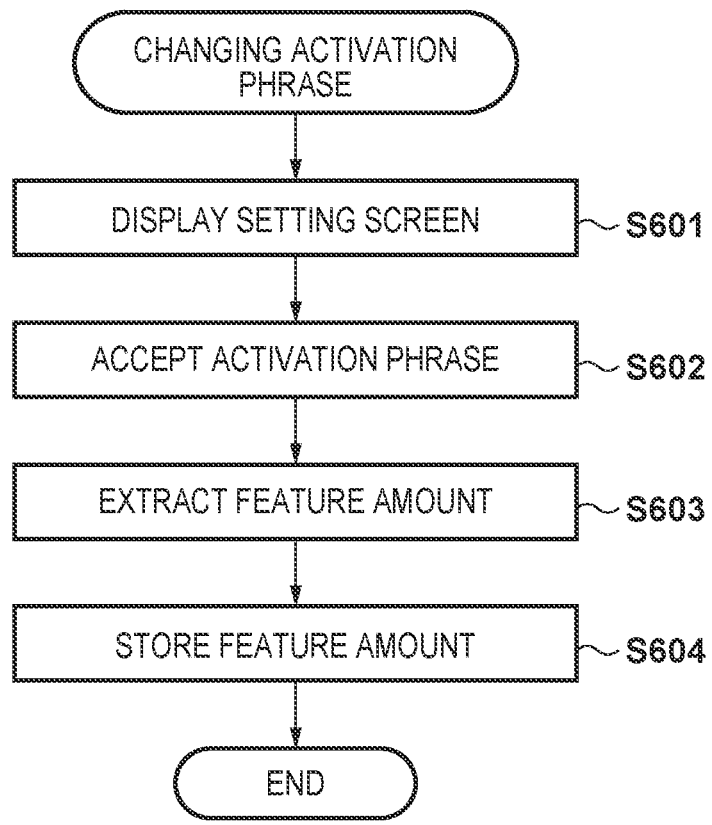
FIG. 8 is a flowchart showing an activation phrase changing process.

FIG. 8 is a flowchart showing the activation phrase changing process. This process shown in FIG. 8 is implemented by, for example, the CPU 201 by loading a program stored in the ROM 202 into the RAM 203 and executing the program.

In step S601, the CPU 201 displays an activation phrase setting screen on the touch panel 222. The activation phrase setting screen may also be displayed by selecting a menu item on the main screen. In step S602, the CPU 201 accepts an activation phrase. That is, in step S602, the CPU 201 displays a message such as "Input activation phrase to microphone" on the setting screen, and the voice analyzing unit 204 accepts the activation phrase input from the microphone 221.

In step S603, the voice analyzing unit 204 extracts the feature amount of the activation phrase input from the microphone 221. For example, the voice analyzing unit 204 extracts the frequency component, the amplitude, the interval, or the rhythm as the feature amount. In step S604, the voice analyzing unit 204 stores the extracted feature amount as the feature amount 211 in the storage unit 210, and terminates the process shown in FIG. 8.

The process shown in FIG. 8 enables the user to set an arbitrary activation phrase. In this configuration, it is possible to use a word that is the same as a default activation phrase preset in the display apparatus 110 while changing the intonation or the like of the word. In addition, it is also possible to change the threshold 212 after the activation phrase is set by the process shown in FIG. 8. For example, it is possible by increasing the threshold 212 to restrict the execution of the voice control function by an activation phrase set by another person.

An activation phrase feature amount changing process will be explained below. When the default activation phrase preset in the display apparatus 110 is, for example, "Hi, wake up", the feature amount such as the intonation, rhythm, or pronunciation of the phrase is set as a standard. Depending on the user, however, it is sometimes difficult to identify the activation phrase due to, for example, a physical reason of utterance or a reason that the language is a dialect. In this embodiment, therefore, voice data is collected from user's conversations in the vehicle 100, and a feature amount is extracted by analyzing the feature of voice data uttered by the user. Then, the feature amount of the preset activation phrase is changed based on the extracted feature amount. A configuration like this can reduce cases in which an activation phrase is hardly identified although the activation phrase is input by the user.

FIG. 9 is a flowchart showing an activation phrase feature amount correcting process. This process shown in FIG. 9 is implemented by, for example, the CPU 201 by loading a program stored in the ROM 202 into the RAM 203 and executing the program. The process shown in FIG. 9 is executed while, for example, the vehicle 100 is traveling.

In step S701, the CPU 201 turns on the microphone 221, and causes the voice analyzing unit 204 to collect voice data of passengers in the vehicle 100 for a predetermined period. This predetermined period for collecting the voice data may also be, for example, a period during which the vehicle 100 travels from the departure point to the destination.

In step S702, the CPU 201 and the voice analyzing unit 204 analyze feature amounts of the collected voice data. For example, words are extracted from the collected voice data, and a feature amount such as the frequency component, the amplitude, the interval, or the rhythm is extracted from each word. Then, the CPU 201 analyzes the tendency of the feature amount of the user based on the extraction results. Examples of the feature amount tendency are: the ends of words are lengthened, the intonation has a predetermined tendency regardless of words, and "hi" sounds like "shi". In step S703, the CPU 201 corrects the feature amount 211 stored in the storage unit 210 based on the analyzed feature amount tendency. For example, the CPU 201 changes the intonation, or changes syllables so that "hi" sounds like "shi".

The process shown in FIG. 9 can correct the feature amount of even the preset activation phrase so that the feature amount becomes closer to a usual feature amount of voice data of the user. A configuration like this facilitates recognizing a user's voice instruction as the activation phrase. It is also possible to store the corrected feature amount in the storage unit 210 by associating the feature amount with user information, and change the feature amount 211 of the default activation phrase to the corrected feature amount when a passenger gets in the vehicle 100 and the ECU 230 identifies the passenger. With a configuration like this, the user can correct the feature amount of the activation phrase so as to facilitate recognition, without voluntarily changing the activation command as shown in FIG. 8.

Summary of Embodiment

The voice recognition apparatus of the abovementioned embodiment is a voice recognition apparatus capable of executing a function by a voice instruction, comprising an input unit (the microphone 221) configured to input a voice, a control unit configured to enable the voice recognition apparatus to accept a voice instruction for executing a function, if a voice input by the input unit is an activation phrase (steps S104 and S105), and a recognition unit configured to, if a voice input by the input unit after the control unit has enabled the voice recognition apparatus to accept the voice instruction contains the activation phrase, recognize the voice instruction by excluding the activation phrase from the voice (steps S110 and S111). A configuration like this can appropriately recognize a voice instruction even when the user repetitively inputs the activation phrase by a voice.

The voice recognition apparatus further comprises a first determination unit configured to determine similarity between a voice input by the input unit and the activation phrase (step S203), wherein based on a result of determination by the first determination unit, the recognition unit determines that a portion where the similarity is not less than a threshold is the activation phrase, and excludes the activation phrase from the voice. A configuration like this can recognize a voice instruction by excluding the activation phrase from the voice based on the similarity.

The voice recognition apparatus further comprises a changing unit configured to change the threshold (step S402), wherein the recognition unit determines that a portion where the similarity is not less than a threshold changed by the changing unit is the activation phrase, and excludes the activation phrase from the voice. The voice recognition apparatus further comprises a second determination unit configured to determine whether the activation phrase meets a condition (step S501), wherein if the second determination unit determines that the activation phrase meets the condition, the changing unit increases the threshold. Also, if the second determination unit determines that the activation phrase does not meet the condition, the changing unit decreases the threshold. In addition, the condition is that a length of the activation phrase is less than a predetermined length. A configuration like this can make a similarity determination criterion stricter if the activation phrase is shorter than a predetermined length, and make the similarity determination criterion looser if the activation phrase is longer than the predetermined length.

The voice recognition apparatus further comprises a setting unit configured to set the activation phrase (FIG. 8). A configuration like this can set an activation phrase desired by the user.

The voice recognition apparatus further comprises an analyzing unit configured to analyze a voice input by the input unit (steps S103 and S108), wherein if a result of analysis by the analyzing unit indicates that the voice input by the input unit is the activation phrase, the control unit enables the voice recognition apparatus to accept the voice instruction. Also, if the result of analysis by the analyzing unit indicates that a voice input by the input unit after the control unit has enabled the voice recognition apparatus to accept the voice instruction contains the activation phrase, the recognition unit recognizes the voice instruction by excluding the activation phrase from the voice. With a configuration like this, the voice recognition apparatus can incorporate a voice analyzing engine for analyzing a voice.

The voice recognition apparatus further comprises an obtaining unit configured to obtain a feature amount of a voice of a user (steps S701 and S702), and a correction unit configured to correct a feature amount of the activation phrase based on the feature amount of the voice of the user, which is obtained by the obtaining unit (step S703), wherein the analyzing unit analyzes a voice input by the input unit by using the feature amount corrected by the correction unit. Also, the correction unit corrects the feature amount of the activation phrase such that the feature amount becomes closer to the feature amount of the voice of the user, which is obtained by the obtaining unit. A configuration like this corrects the feature amount of the activation phrase so that the feature amount becomes closer to the tendency of the utterance of the user, and hence can avoid an event in which the apparatus is not activated even by a voice input by the user.

Furthermore, the voice recognition apparatus is mounted in a vehicle, and the user is a passenger of the vehicle. With a configuration like this, the voice recognition apparatus can be mounted in a vehicle.

The invention is not limited to the abovementioned embodiment and can variously be modified and changed without departing from the spirit and scope of the invention.

What is claimed is:

1. A voice recognition apparatus capable of executing a function by a voice instruction, comprising:
   a microphone configured to input a voice;
   at least one processor circuit with a memory comprising instructions, that when executed by the processor circuit, cause the at least one processor circuit to at least:
   analyze a first voice input by the microphone and determine whether the first voice is an activation phrase which is a trigger to accept a voice instruction for executing a function;
   analyze a second voice which is input by the microphone subsequently to the first voice, if the first voice is determined to be the activation phrase;
   determine whether the second voice contains the activation phrase;
   if the second voice contains the activation phrase, delete the activation phrase from the second voice and recognize the voice instruction.

2. The apparatus according to claim 1, wherein the instructions, when executed by the at least one processor circuit, further cause the at least one processor circuit to at least:
   determine similarity between a voice input by the microphone and the activation phrase, and
   based on a result of the determining of the similarity, determine that a portion where the similarity is not less than a threshold is the activation phrase, and exclude the activation phrase from the voice.

3. The apparatus according to claim 2, wherein the instructions, when executed by the at least one processor circuit, further cause the at least one processor circuit to at least:
   change the threshold, and
   determine that a portion where the similarity is not less than the changed threshold is the activation phrase, and exclude the activation phrase from the voice.

4. The apparatus according to claim 3, wherein the instructions, when executed by the at least one processor circuit, further cause the at least one processor circuit to at least:
   determine whether the activation phrase meets a condition, and
   increase the threshold if the activation phrase meets the condition.

5. The apparatus according to claim 4, wherein the instructions, when executed by the at least one processor circuit, further cause the at least one processor circuit to at least decrease the threshold if the activation phrase does not meet the condition.

6. The apparatus according to claim 4, wherein the condition is that a length of the activation phrase is less than a predetermined length.

7. The apparatus according to claim 1, wherein the instructions, when executed by the at least one processor circuit, further cause the at least one processor circuit to at least set the activation phrase.

8. The apparatus according to claim 1, wherein the instructions, when executed by the at least one processor circuit, further cause the at least one processor circuit to at least:
   if it is determined that the first voice input by the microphone is the activation phrase, enable the voice recognition apparatus to accept the voice instruction.

9. The apparatus according to claim 8, wherein if it is determined that the second voice input by the microphone after the voice recognition apparatus is enabled to accept the voice instruction, contains the activation phrase, the voice instruction is recognized by deleting the activation phrase from the voice.

10. The apparatus according to claim 8, wherein the instructions, when executed by the at least one processor circuit, further cause the at least one processor circuit to at least:
    obtain a feature amount of a voice of a user; and
    correct a feature amount of the activation phrase based on the feature amount of the voice of the user,
    wherein a voice input by the microphone is analyzed by using the corrected feature amount.

11. The apparatus according to claim 10, wherein the feature amount of the activation phrase is corrected such that the feature amount becomes closer to the feature amount of the voice of the user.

12. The apparatus according to claim 10, wherein the voice recognition apparatus is mounted in a vehicle, and the user is a passenger of the vehicle.

13. A voice recognition method to be executed in a voice recognition apparatus capable of executing a function by a voice instruction, comprising:
    inputting a voice via a microphone coupled to at least one processor circuit with a memory;
    analyzing via the at least one processor circuit a first voice input by the microphone and determine whether the first voice is an activation phrase which is a trigger to accept a voice instruction for executing a function;
    analyzing via the at least one processor circuit a second voice which is input by the microphone subsequently to the first voice if the first voice is determined to be the activation phrase;
    determining via the at least one processor circuit whether the second voice contains the activation phrase;
    deleting the activation phrase from the second voice and recognizing the voice instruction via the at least one processor circuit if the second voice input contains the activation phrase.

14. A voice recognition apparatus capable of executing a function by a voice instruction, comprising:
    a microphone configured to input a voice;
    at least one processor circuit with a memory comprising instructions, that when executed by the processor circuit, cause the at least one processor circuit to at least:
    enable the voice recognition apparatus to accept a voice instruction for executing a function, if a voice input by the microphone is an activation phrase; and
    if a voice input by the microphone after the voice recognition apparatus has been enabled to accept the voice instruction contains the activation phrase, recognize the voice instruction by excluding the activation phrase from the voice,
    wherein the instructions further cause the at least one processor circuit to at least:
    determine similarity between a voice input by the microphone and the activation phrase, and based on a result of the determining of the similarity, determine that a portion where the similarity is not less than a threshold is the activation phrase, and exclude the activation phrase from the voice.

15. A method for executing a function by a voice instruction, comprising:
  inputting a voice via a microphone coupled to at least one processor circuit having a memory;
  enabling via the at least one processor circuit an acceptance of a voice instruction for executing a function if the voice input via the microphone is an activation phrase; and
  recognizing via the at least one processor circuit the voice instruction by excluding the activation phrase from the voice if, after enabling the acceptance of the voice instruction, the voice input via the microphone contains the activation phrase, wherein the activation phrase is excluded from the voice by:
    determining a similarity between a voice input by the microphone and the activation phrase; and
    based on a result of the determining of the similarity, determining that a portion where the similarity is not less than a threshold is the activation phrase, and excluding the activation phrase from the voice.

* * * * *